(12) United States Patent
Leboeuf (10) Patent No.: US 10,371,840 B2
(45) Date of Patent: Aug. 6, 2019

(54) TENSION MONITORING METHOD AND SYSTEM FOR TOWED ANTENNA

(71) Applicant: SERCEL, Carquefou (FR)

(72) Inventor: Simon Leboeuf, Monnieres (FR)

(73) Assignee: SERCEL, Carquefou (FR)

( * ) Notice: Subject to any disclaimer, the term of this patent is extended or adjusted under 35 U.S.C. 154(b) by 420 days.

(21) Appl. No.: 15/205,564

(22) Filed: Jul. 8, 2016

(65) Prior Publication Data

US 2018/0011220 A1    Jan. 11, 2018

(51) Int. Cl.
*H04B 17/00* (2015.01)
*G01V 1/20* (2006.01)
*G01V 1/38* (2006.01)

(52) U.S. Cl.
CPC .............. *G01V 1/201* (2013.01); *G01V 1/38* (2013.01)

(58) Field of Classification Search
None
See application file for complete search history.

(56) References Cited

U.S. PATENT DOCUMENTS

| | | | |
|---|---|---|---|
| 9,638,816 B2 * | 5/2017 | Rentsch-Smith | G01V 1/364 |
| 2006/0283247 A1 * | 12/2006 | Liu | G01P 15/0975 73/514.01 |
| 2007/0079656 A1 * | 4/2007 | Cook | G01P 15/0975 73/514.34 |
| 2013/0077437 A1 * | 3/2013 | Mulargia | G01V 1/48 367/31 |

OTHER PUBLICATIONS

Teigen, Øyvind, et al. "Characterization of noise modes in multicomponent (4C) towed streamers." ;SEG Technical Program Expanded Abstracts 2012. Society of Exploration Geophysicists, 2012. 1-5. (Year: 2012).* de Bruin, Eling D., et al. "A validity study of phase velocity measurements in spinal cord injury." Journal of Rehabilitation Research & Development 42.1 (2005). (Year: 2005).*

* cited by examiner

*Primary Examiner* — Isam A Alsomiri
*Assistant Examiner* — Jonathan D Armstrong
(74) *Attorney, Agent, or Firm* — Patent Portfolio Builders PLLC (57) ABSTRACT

A method for calculating a tension (T) in a towed antenna. The method includes towing the antenna in water, wherein the antenna includes plural particle motion sensors distributed along the antenna; measuring with the plural particle motion sensors vibrations that propagate along the antenna; calculating a value of a phase velocity (vp) of the vibrations that propagate along the antenna based on (1) an offset between two particle motion sensors and (2) a time delay of the vibrations that propagate from one of the two particle motion sensors to another one of the two particle motion sensors; selecting a relation that links the phase velocity (vp) to the tension (T); and using the value of the phase velocity and the relation to determine the tension (T) at various locations of the plural particle motion sensors along the antenna.

20 Claims, 9 Drawing Sheets

TENSION MONITORING METHOD AND SYSTEM FOR TOWED ANTENNA

BACKGROUND

Technical Field

Embodiments of the subject matter disclosed herein generally relate to methods and systems and, more particularly, to mechanisms and techniques for monitoring a tension that appears in an antenna that is towed in water by a vessel.

Discussion of the Background

Reflection seismology is a method of geophysical exploration to determine the properties of a portion of the earth's subsurface, information that is especially helpful for determining the location of underground deposits (e.g., oil, gas, etc.). Marine reflection seismology is based on the use of a controlled source that sends energy waves into the earth. By measuring the time it takes for the reflections to come back to plural receivers, it is possible to estimate the depth and/or composition of the features causing such reflections. These features may be associated with the underground deposits.

Figure 1:
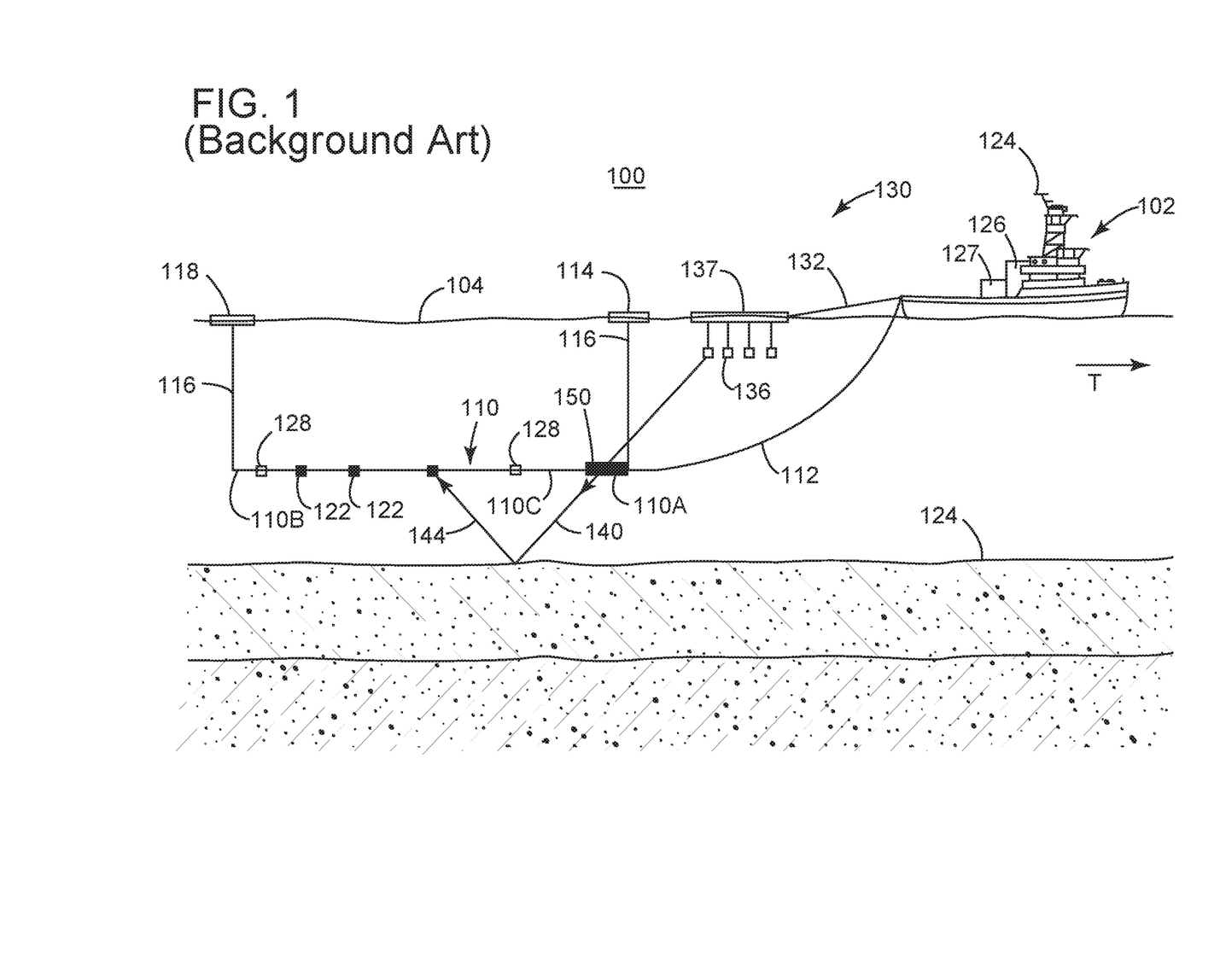
FIG. 1 is a schematic diagram of a marine seismic acquisition system.

For marine applications, a conventional seismic survey system 100, as illustrated in FIG. 1, includes a vessel 102 that tows plural streamers 110 (only one is shown in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to a head end 110A of streamer 110, while a tail buoy 118 is connected, through a similar cable 116, to a tail end 110B of streamer 110. Head float 114 and tail buoy 118 are used, among other things, to maintain the streamer's depth. Seismic receivers 122 are distributed along the streamer and are configured to record seismic data. Seismic receivers 122 may include a hydrophone, geophone, accelerometer, gradient pressure receiver or a combination thereof. Positioning devices (birds) 128 (only one shown for simplicity) are attached along the streamer and controlled by a controller 126 for adjusting a position of the streamer according to a survey plan.

Source array 130 has plural source elements 136, which typically are air guns. The source elements are attached to a float 137 to travel at desired depths below the water surface 104. During operation, vessel 102 follows a predetermined path T while source elements 136 emit seismic waves 140. These waves bounce off the ocean bottom 142 and other layer interfaces below the ocean bottom 142 and propagate as reflected/refracted waves 144 that are recorded by receivers 122. The positions of both the source element 136 and recording receiver 122 are estimated based on GPS systems 124 and recorded together with the seismic data in a storage device 127 onboard the vessel. Controller 126 has access to the seismic data and may be used to achieve quality control or even full processing of this data. Controller 126 may be also connected to the vessel's navigation system and other elements of the seismic survey system, e.g., birds 128.

During the seismic acquisition process, the tensile loads of the towed seismic streamers have to be monitored, especially during deployment and retrieval operations. This is so because a higher tensile load on the streamer may rupture or damage or break the streamer. Currently, the tensile load is measured by an in-line tensile module 150 (see FIG. 1) inserted between the lead-in 112 and the first active section 110C of the streamer. The in-line tensile module includes a tensile load sensor that can measure the tensile load generated by towing the entire streamer in water. However, this module allows measuring the tensile load only in one location of the streamer.

Another problem with the existing in-line tensile modules is that, during the deployment and retrieval phases of the streamer, the tensile module may be wrapped onto the winch on the vessel and thus, unable to provide any relevant tensile load measurements.

Thus, there is a need to provide tensile module load information about a towed cable in water, even when part of the towed cable is on the vessel.

SUMMARY

According to one embodiment, there is a method for calculating a tension (T) in a towed antenna. The method includes towing the antenna in water, wherein the antenna includes plural particle motion sensors distributed along the antenna; measuring with the plural particle motion sensors vibrations that propagate along the antenna; calculating a value of a phase velocity (vp) of the vibrations that propagate along the antenna based on (1) an offset between two particle motion sensors and (2) a time delay of the vibrations that propagate from one of the two particle motion sensors to another one of the two particle motion sensors; selecting a relation that links the phase velocity (vp) to the tension (T); and using the value of the phase velocity and the relation to determine the tension (T) at various locations of the plural particle motion sensors along the antenna.

According to another embodiment, there is a computing device for calculating a tension (T) in a towed antenna. The computing device includes an interface for receiving recordings from plural particle motion sensors distributed along the antenna, wherein the recording are indicative of vibrations that propagate along the antenna; and a processing unit connected to the interface. The processing unit is configured to calculate a value of a phase velocity (vp) of the vibrations that propagate along the antenna based on (1) an offset between two particle motion sensors and (2) a time delay of the vibrations that propagate from one of the two particle motion sensors to another one of the two particle motion sensors; select a relation that links the phase velocity (vp) to the tension (T); and use the value of the phase velocity and the relation to determine the tension (T) at various locations of the plural particle motion sensors along the antenna.

According to still another embodiment, there is a streamer to be towed in water for collecting seismic data. The streamer includes a body; plural particle motion sensors located inside the body; and a computing device located inside the body. The computing device includes an interface for receiving recordings from the plural particle motion sensors, wherein the recording are indicative of vibrations that propagate along the streamer, and a processing unit connected to the interface. The processing unit is configured to calculate a value of a phase velocity (vp) of the vibrations that propagate along the streamer based on (1) an offset between two particle motion sensors and (2) a time delay of the vibrations that propagate from one of the two particle motion sensors to another one of the two particle motion sensors; select a relation that links the phase velocity (vp) to the tension (T); and use the value of the phase velocity and the relation to determine the tension (T) at various locations of the plural particle motion sensors along the antenna.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers (except the first digit) in different drawings identify the same or similar elements. The following detailed description does not limit the invention. Instead, the scope of the invention is defined by the appended claims. The following embodiments are discussed, for simplicity, with regard to the terminology and structure of a streamer towed in water by a vessel. However, the embodiments to be discussed next are not limited to a marine streamer; they may be applied to other seismic elements that are towed in water, for example, an antenna or any cable that hosts particle motion sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a streamer (or antenna) that includes seismic sensors capable of measuring a quantity (e.g., speed, displacement, or acceleration) indicative of a particle motion. If the streamer is towed in water, the seismic sensor measures the above quantity, which is indicative of the water motion. Such a sensor may be an accelerometer. Because a hydrophone is not sensitive to water motion, a hydrophone cannot be used for the methods to be discussed next. Any sensors that measure the above noted quantity are called herein particle motion sensors. The particle motion sensors are distributed along the streamer. Based on information recorded by the particle motion sensors, the tensile load in the streamer, at each location of the particle motion sensors may be calculated. This means that the tensile load in the streamer may be determined even if half of the streamer is already rolled up on the towing vessel.

One advantage of such streamer is that the tensile load information along the streamer can be calculated without the need of any additional tensile load sensor. In other words, the particle motion sensors that are typically used in a streamer for collecting seismic data may also be used, as will be discussed next, to calculate the tensile load along the streamer. Thus, during seismic acquisition, this streamer may be used to find the tensile load (or tension) along the streamer, to find the location of a floating object (e.g., fishing net) caught in the streamer (or bird) as a discontinuity in the curve corresponding to the tension versus length of the streamer. The tension in the streamer may be calculated when the streamer records seismic data or not. During deployment or retrieval, the method may be used to monitor the tension in the part of the streamer that is still in water. Note that a traditional tensile load sensor cannot provide such information as this sensor is already rolled up on the drum holding the streamer on the vessel. Knowing the tensile load in the streamer during deployment and/or retrieval is also useful for determining the winding/unwinding speed of the streamer. Thus, with the method to be discussed next, the winding speed of the streamer (or drum) can be controlled (adjusted) depending on the measured tensile load. According to an embodiment, the novel method of measuring the tensile load along the streamer achieves these results without any dedicated tensile load sensor or module.

Figure 2:
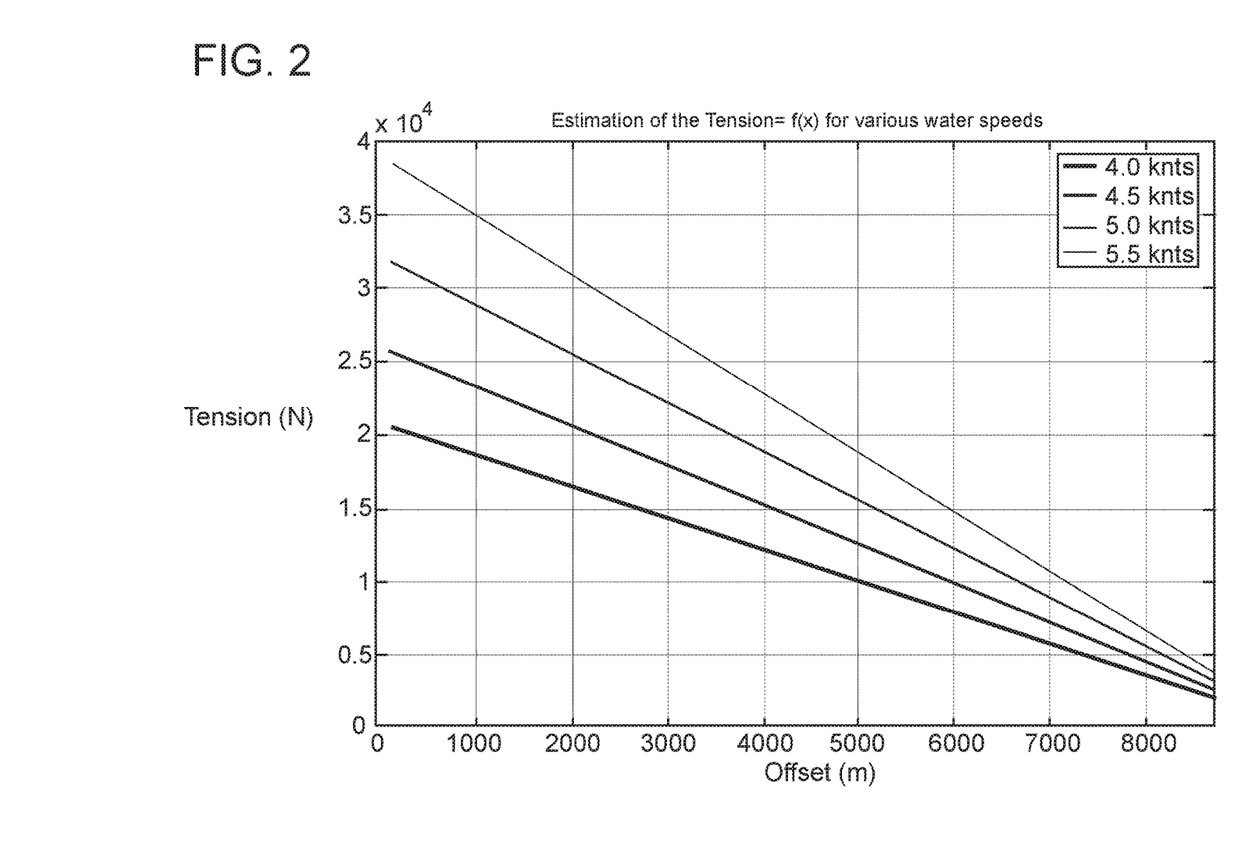
FIG. 2 illustrates an estimate of a tension in a towed streamer versus offset, for different water speeds.

The tensile load in a towed seismic streamer is now discussed. The tensile load is a function of the inline offset (distance between vessel or streamer's head and the point where the tension is calculated) or streamer length x. The tensile load can be expressed as a sum of the drag forces exerted on the body of the streamer, the drag forces exerted on the buoy (118 and/or 114), and the drag forces exerted on any device (e.g., bird 128) attached to the body of the streamer. FIG. 2 represents an estimation of the tension for a streamer having a length of about 8,700 m, with typical birds and tail buoy. Each curve corresponds to a different speed of the streamer in water. The tension has a quasi linear distribution along the streamer.

Seismic streamers are subject to several modes of vibration due to the action of ocean surface waves, tugging, external devices, current, etc. The particle motion sensors distributed in the streamers are sensitive enough to pick up these vibration noises. Typical modes of vibration include longitudinal vibrations, transverse vibrations and angular vibrations. The transverse vibrations are most dominant, i.e., larger amplitude, and for this reason, as will be discussed next, this type of vibration is considered in further calculations.

The Euler-Bernoulli equation describing a transverse motion of a streamer in water that is towed along an axial direction of the streamer with constant water speed $U_0$ is used to approximate the transverse vibrations that propagate in the streamer, and it is as follows:

$$EI\frac{\partial^4 \varphi}{\partial x^4} - T\frac{\partial^2 \varphi}{\partial x^2} + m\frac{\partial^2 \varphi}{\partial t^2} = F(x, t), \qquad (1)$$

where t is the time, x is the inline axis, φ(x,t) is the transverse displacement, E is the Young modulus of the cable, I is the area moment of inertia, m is the mass per unit length of the streamer, T is the axial tension due to the towing vessel, and F(x,t) is the external force exerted on a portion of the cable by the ambient. The external force may include a term that corresponds to the inertial force corresponding to the acceleration of the mass of water displaced by the streamer, and a term that corresponds to the viscous force corresponding to the friction between the surface of the streamer and the water. The product EI is called herein the flexural rigidity.

Equation (1) is used now to calculate the tensile load on the streamer. In a first approach, the water speed (i.e., the speed of the vessel or streamer relative to the water) is considered to be zero. This is equivalent to holding the streamer in water and applying a tension T to it, by any known means. Although this particular situation is not realistic, it will be shown that the tensile load obtained with this simplification is close to reality and allows for fast computations on board of the vessel. A more accurate situation is considered later and the tensile load (or tension T) is recalculated based on this scenario.

Returning to the approximation that the water speed is zero, equation (1) becomes:

$$EI\frac{\partial^4 \varphi}{\partial x^4} - T\frac{\partial^2 \varphi}{\partial x^2} + \rho_a \pi \frac{d^2}{4} \frac{\partial^2 \varphi}{\partial t^2} = 0, \quad (2)$$

where $\rho_a = \rho_c + \rho_w$ is the effective density of the streamer and d is the diameter of the streamer. The effective density of the streamer is the density of the cable $\rho_c$ plus the density of the water $\rho_w$ (for the water volume displaced by the streamer).

The eigen-function of equation (2) will have the form of $\varphi(x,t) = Ae^{i2\pi(ft \pm kx)}$ with f being the frequency and k the wavenumber.

The phase velocity of the resultant waves can be expressed as:

$$v_p(k) = \pm \frac{2}{d}\sqrt{\frac{T + 4\pi^2 k^2 EI}{\pi \rho_a}}. \quad (3)$$

The sign ± gives the direction of the wave, e.g., head-to-tail is downgoing and tail-to-head is upgoing.

Figure 3:
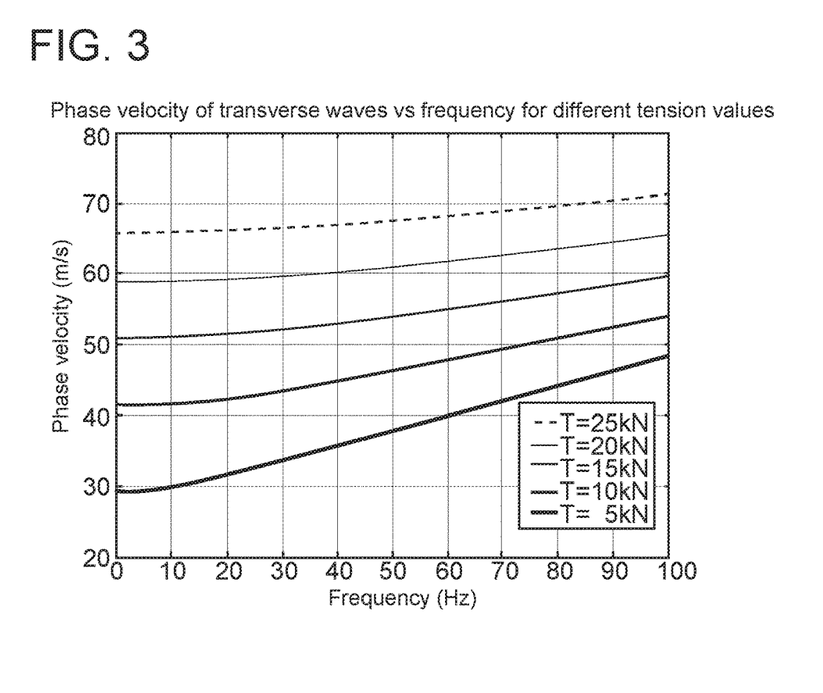
FIG. 3 illustrates a phase velocity versus frequency for different tension values applied to a streamer.

If the phase velocity given by equation (3) is plotted versus frequency for a tension that varies from 5 to 30 kN, it results, as illustrated in FIG. 3, in transverse waves travelling back and forth with a phase velocity between 30 and 75 m/s. Equation (3) indicates that the transverse waves are dispersive. In this regard, FIG. 3 shows that the high frequencies are travelling faster than the low frequencies. However, one can see that the phase velocity could be approximated to be a constant in the very low frequencies range (e.g., below 15 Hz).

For these low frequencies, the following relation holds: $4\pi^2 k^2 EI \ll T$ and thus, the term corresponding to the flexural rigidity EI could be neglected. With this approximation, the phase velocity becomes:

$$v_p(k) = \pm \frac{2}{d}\sqrt{\frac{T}{\pi \rho_a}}. \quad (4)$$

The phase velocity $v_p$ may be calculated as now discussed. Because the channels (particle motion sensors) are usually uniformly spatially sampled (they are uniformly distributed along the streamer) and as the dominant noise below 15 Hz is due to the transverse vibrations, it is possible to compute the phase velocity by estimating the time delay between adjacent particle motion sensors within a streamer and then divide an offset between the adjacent sensors with the time delay. In other words, if a transverse vibration propagates along the streamer, it will first affect particle motion sensor $S_i$ and then the particle motion sensor $S_{i+1}$. Because the particle motion sensors record the transverse movement of the streamer, it is possible from these two recordings, to extract the time $t_i$ when $S_i$ measured first the vibration and the time $t_{i+1}$ when $S_{i+1}$ measured second the same vibration. The time difference $t_{i+1} - t_i$ represents the time delay of the vibration. In this regard, there are several techniques (e.g., generalized cross correlation) in time or frequency domain that can be used to estimate the time delay between adjacent channels. Knowing the distance D (usually 12.5 m) between adjacent sensors $S_i$ and $S_{i+1}$, the value of the phase velocity may be determined.

Figure 4:
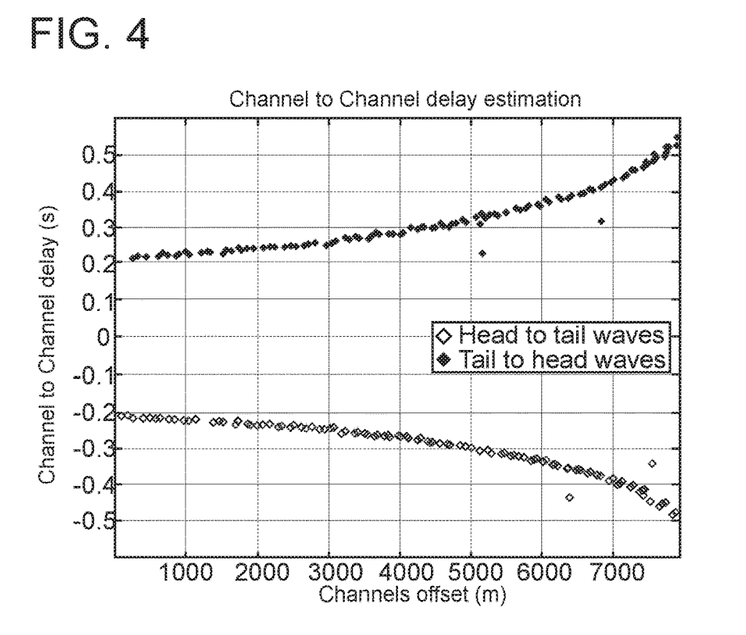
FIG. 4 illustrates channel to channel time delays versus channel offsets for a tensioned streamer.

FIG. 4 shows the results of the time delay estimation between adjacent channels using a GCC-PHAT (GCC PHAse Transform) algorithm. One can see that the result per channel could be either a negative delay, indicating a head-to-tail wave (downgoing) propagation, or a positive delay, indicating a tail-to-head (upgoing) wave propagation. This is in agreement with equations (3) and (4), which indicate that the sign of the time delay depends on the direction of the dominant transverse wave at a given location.

Thus, the value of the phase velocity may be calculated using formula:

$$v_{p_{est}} = \frac{\text{Channel Spacing } (m)}{\text{Time delay } (s)}. \quad (5)$$

Figure 5:
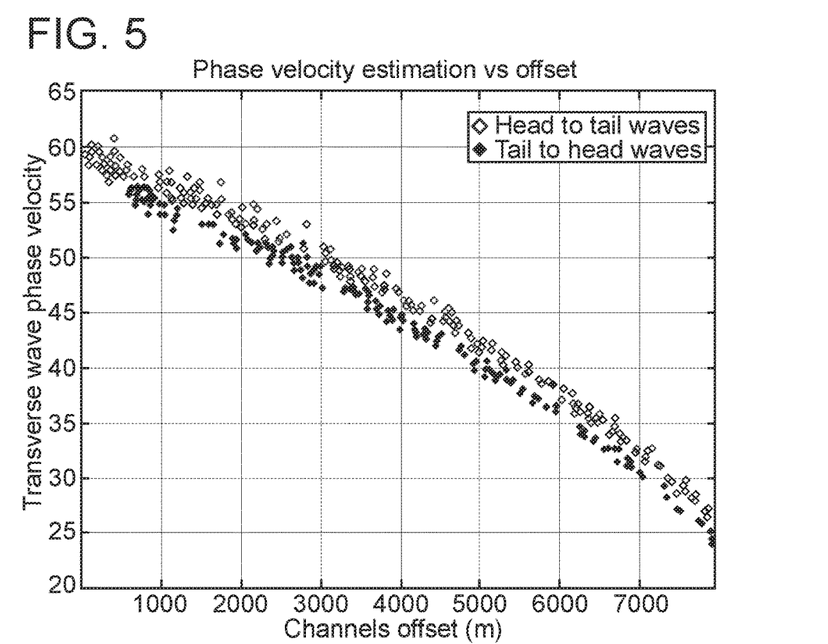
FIG. 5 illustrates a phase velocity versus offset along a streamer with zero water speed velocity.
Figure 8:
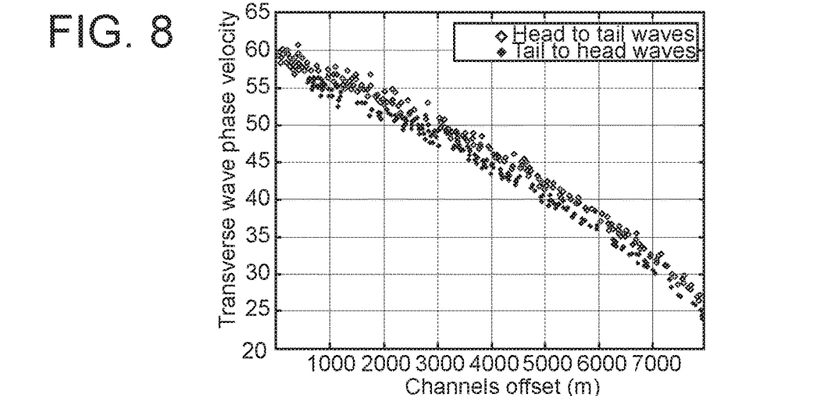
FIG. 8 illustrates a phase velocity estimate versus offset along a streamer with zero water speed velocity model.

By using formula (5) and the measurements acquired with a set of accelerometers (20 s of signal) for an 8 km particle motion sensor streamer, it is possible to estimate the phase velocity for various channels offset as illustrated in FIG. 5. A channel offset in FIG. 8 is considered to be the distance between a channel (i.e., particle motion sensor) and a reference position, usually, the head of the streamer or the vessel. Some segments (length between two consecutive sensors or channels) are excluded from the analysis because of their different flexural rigidity, especially for those sensors located on both sides of external devices (positioning devices, retrievers) and on section ends. The sign of the velocity (depending of direction) has not been taken into account in FIG. 8 in order to obtain a more convenient representation.

FIG. 5 also shows that the "head to tail" waves are traveling slightly faster than the waves in the opposite direction, because of the effect of the water speed $U_0$ that has been removed from the analysis.

By using equation (4), it is possible to estimate the tension T as follows:

$$T = \pi \rho_a \left(\frac{d}{2} v_p\right)^2. \quad (6)$$

Figure 6:
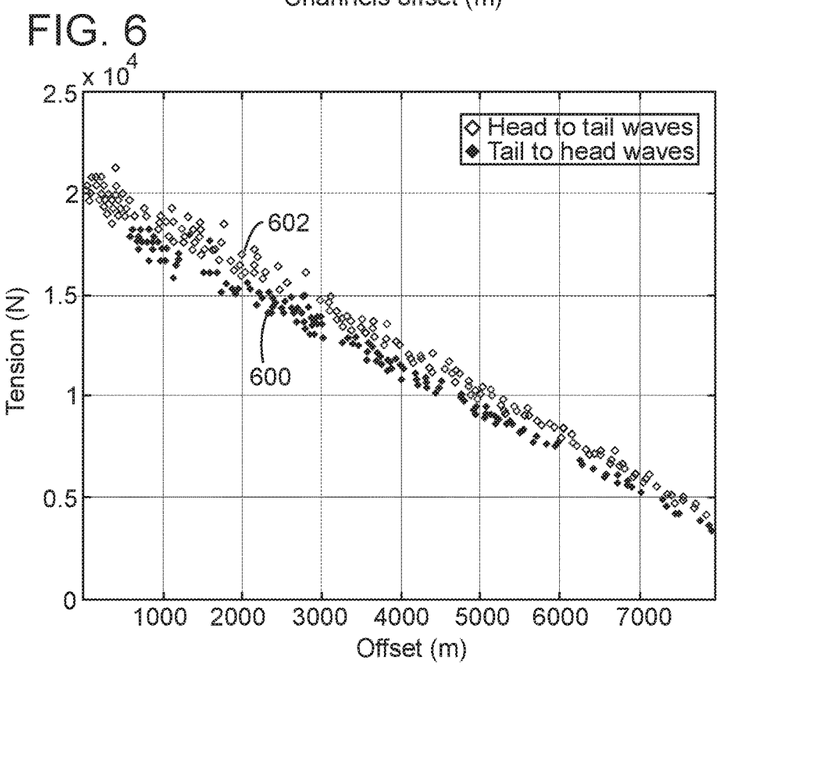
FIG. 6 illustrates an estimate tension versus offset along a streamer.

Based on equation (6), the tension T along the length of the streamer can be calculated as illustrated in FIG. 6. Note that the phase speed $v_p$, as calculated by equation (5) and as illustrated in FIG. 5, varies with the offset or inline distance x of the streamer. As expected (see FIG. 2), the tension T decreases linearly along the streamer. The tension can thus be monitored along the entire streamer using windows of 10 to 20 s of data, for example, sliding the window with steps of about 5 s. The effects of the water speed is visible as two distinct linear distributions 600 and 602 can be seen.

Another approach for calculating the phase velocity and implicitly the tension in the streamer (which may be more accurate than the previous approach), is now discussed. Instead of assuming that the water speed is zero as in the previous approach, the present approach considers the water speed to be constant and different from zero. The effect of the drag forces on the cable is assumed to be zero. With these assumptions, equation (1) produces two solutions in terms of the phase velocity:

$$v_{p1} = \frac{\rho_w U_0}{\rho_a}\left[\sqrt{1 + \frac{\rho_a}{\rho_w}\left(\frac{T}{\sigma U_0^2} - 1\right)} - 1\right] \tag{7}$$

and $$v_{p2} = -\frac{\rho_w U_0}{\rho_a}\left[\sqrt{1 + \frac{\rho_a}{\rho_w}\left(\frac{T}{\sigma U_0^2} - 1\right)} + 1\right], \tag{8}$$

with $$\sigma = \pi\rho_w \frac{d^2}{4}.$$

Figure 7:
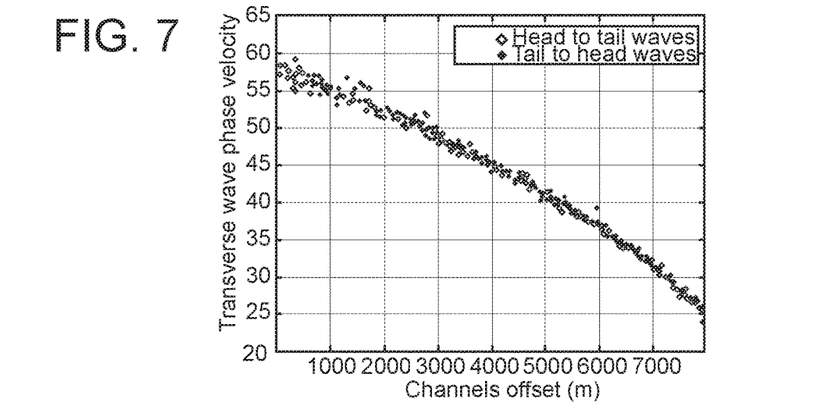
FIG. 7 illustrates a phase velocity estimate versus offset along a streamer with non-zero water speed velocity model.
Figure 9:
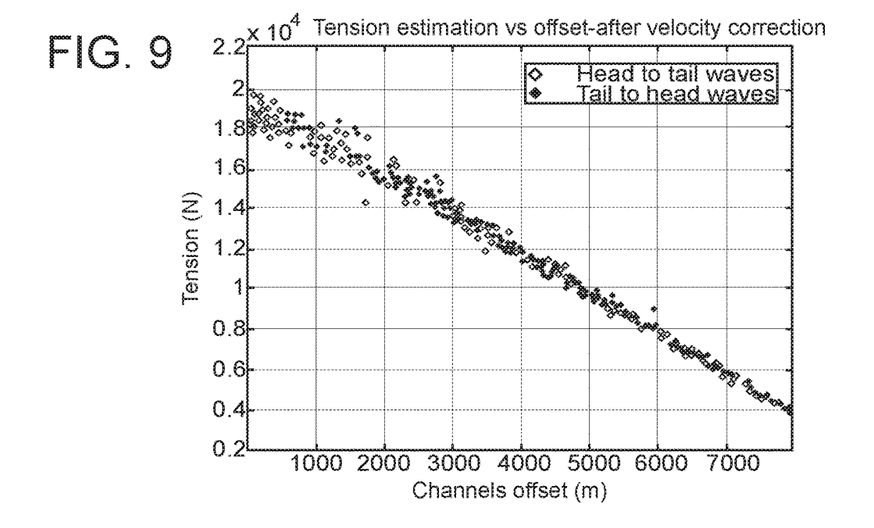
FIG. 9 illustrates the tension estimate in a streamer with non-zero water speed velocity model.

The water speed $U_0$ can be measured with a dedicated sensor attached to the streamer or vessel. The phase velocity versus the offset (for equations (7) and (8) used together with equation (5)) is plotted in FIG. 7. For comparison, FIG. 8 (the plot from FIG. 5) shows the phase velocity versus offset with the water speed velocity being zero. A small difference is observed between the velocities in FIGS. 7 and 8, which indicate that even with the water speed assumed to be zero, the results of the above calculations for the tension are accurate. FIG. 9 plots the tension versus offset with non-zero water speed (using equation (6)). Note that all these plots show two different sets of data, which correspond to the transverse mode moving up or down the streamer.

If the water speed is unknown, then equations (7) and (8) can be combined, which results in:

$$\frac{v_{p1} - v_{p2}}{2} = \frac{2}{d}\sqrt{\frac{T}{\pi\rho_a} - \frac{d^2 U_0^2}{16}}. \tag{9}$$

Because $$\frac{d^2 U_0^2}{16} \ll \frac{T}{\pi\rho_a},$$

it is possible to rewrite equation (9) as:

$$\frac{v_{p1} - v_{p2}}{2} \approx v_p = \frac{2}{d}\sqrt{\frac{T}{\pi\rho_a}}. \tag{10}$$

Then, the tensions for the two speeds $v_{p1}$ and $v_{p2}$ can be written as:

$$T_1 = \pi\rho_a\left(\frac{d}{2}v_{p1}\right)^2 \text{ and } T_2 = \pi\rho_a\left(\frac{d}{2}v_{p2}\right)^2.$$

An average tension can be defined as:

$$\frac{T_1 + T_2}{2} = \pi\rho_a\frac{d^2}{4}\left(\frac{v_{p1}^2 + v_{p2}^2}{2}\right). \tag{11}$$

Substituting equations (7) and (8) into equation (11), leads to:

$$\frac{T_1 + T_2}{2} = T + \pi\rho_a\frac{d^2}{4}\left(\frac{2\rho_w^2 U_0^2}{\rho_a^2} - \frac{\rho_w U_0^2}{\rho_a}\right). \tag{12}$$

For a neutrally buoyant streamer, i.e.

$$\frac{\rho_w}{\rho_a} = \frac{1}{2},$$

the following relation holds:

$$\frac{T_1 + T_2}{2} = T. \tag{13}$$

Therefore, the velocity and the tension can be estimated with a good accuracy without knowing the water speed $U_0$.

The estimated velocity and tension values can be separated in two groups depending on wave direction (up or down the streamer). Then, the relation between the actual tension and inline offset x can be found by linear regression by using, for example, the following linear expressions:

$$\hat{T}_1 = p_1(1)x + p_1(2) \text{ and} \tag{14}$$

$$\hat{T}_2 = p_2(1)x + p_2(2), \tag{15}$$

with x being the inline offset, and $\hat{T}_1(x)$ being a polynomial of degree 1 that fits the data $\hat{T}_1$ to $T_1$ in the least square sense. Similarly, $\hat{T}_2(x)$ is the polynomial of degree 1 that fits the data $\hat{T}_2$ to $T_2$ in the least square sense.

An estimation of the tension $\hat{T}$ can be found using equation (13):

$$\hat{T} = \frac{\hat{T}_1 + \hat{T}_2}{2} \tag{16}$$

Figure 10:
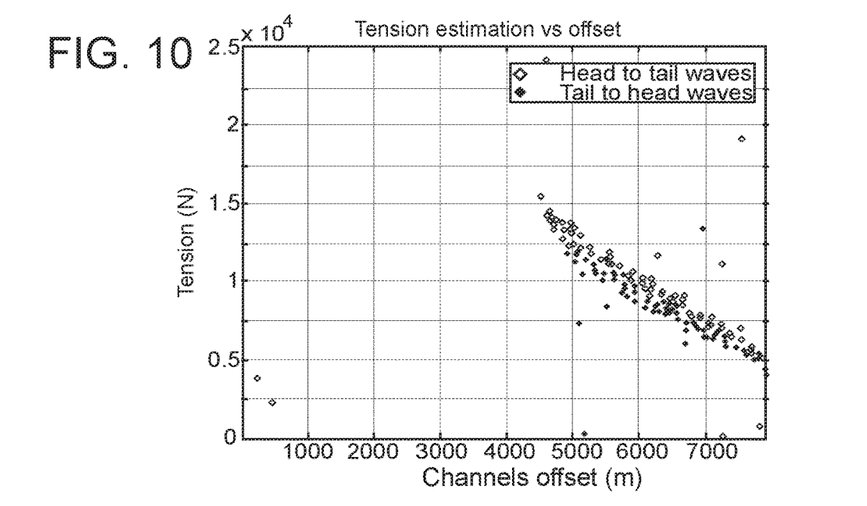
FIG. 10 illustrates the tension estimate in a part of the streamer that is towed while the other part is on the vessel.

To exemplify the power of the novel methods discussed above, the tension in the cable during the recovery process (i.e., part of the streamer is towed in water while the other part of the streamer is already on the vessel) has been calculated (assuming a non-zero water speed) based on equations (7) and (8) and the results are shown in FIG. 10. FIG. 10 indicates that the first 4,500 m of the streamer have been already recovered. This means that the methods discussed above offer the vessel's operator the capability to monitor the streamer tension during deployment or retrieval, which is not possible with the current tensile load module discussed in the Background section.

Figure 11:
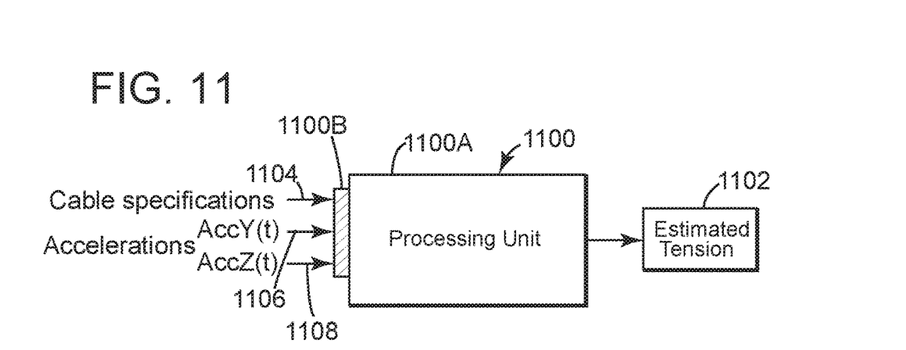
FIG. 11 illustrates a computing device for calculating a tension in a streamer.
Figure 12:
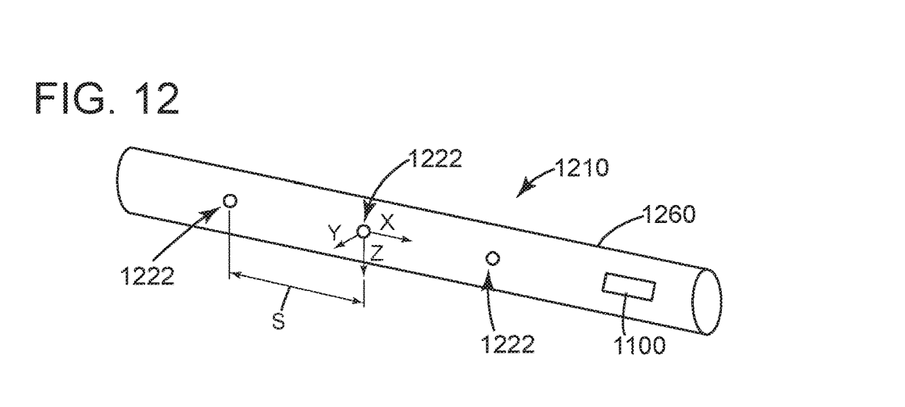
FIG. 12 illustrates an antenna having plural particle motion sensors.

The methods discussed above may be implemented, for example, as illustrated in FIG. 11, in a computing device 1100, which includes a processing unit 1100A and an interface 1100B. The inputs used for calculating the tension output 1102 are: the streamer specifications 1104 (e.g., diameter, density, length), and the accelerations or velocities or displacements 1106 and 1108 along two axes perpendicular to the length of the streamer. FIG. 12 shows a portion of a streamer (or antenna) 1210 having a body 1260 within which plural particle motion sensors (PMS) 1222 are located. The PMS 1222 are linked to a computing device 1100, which may be the device discussed above with regard to FIG. 11. The figure shows only three particle motion sensors 1222 distributed with a predetermined space S. FIG. 12 also indicates the inline direction X along the length of the streamer, the cross-line direction Y perpendicular to the inline indirection and in the water plane, and a third direction Z perpendicular on both the X and Y directions.

Some methods for monitoring the tension in the streamer (antenna) discussed above are now presented. Note that the embodiments discussed above apply to any antenna towed in water and having particle motion sensors within or attached to the body of the antenna.

Figure 13:
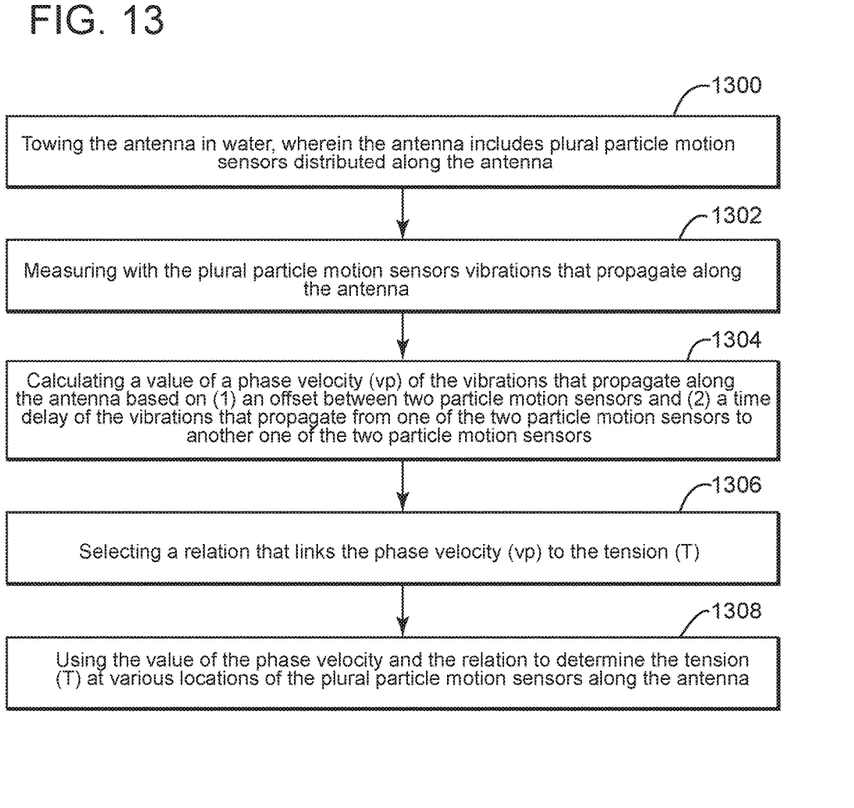
FIG. 13 is a flowchart of a method for calculating a tension along an antenna.

FIG. 13 is a flowchart of such a method. The method includes a step 1300 of towing the antenna (1210) in water, wherein the antenna (1210) includes plural particle motion sensors (1222) distributed along the antenna (1210), a step 1302 of measuring with the plural particle motion sensors (1222) vibrations that propagate along the antenna (1210), a step 1304 of calculating a value of a phase velocity (vp) of the vibrations that propagate along the antenna (1210) based on (1) an offset between two particle motion sensors and (2) a time delay of the vibrations that propagate from one of the two particle motion sensors to another one of the two particle motion sensors; a step 1306 of selecting a relation that links the phase velocity (vp) to the tension (T); and a step 1308 of using the value of the phase velocity and the relation to determine the tension (T) at various locations of the plural particle motion sensors along the antenna (1210). This method may be implemented in a computing device located inside the streamer, on the towing vessel or distributed between the streamer and the vessel.

Figure 14:
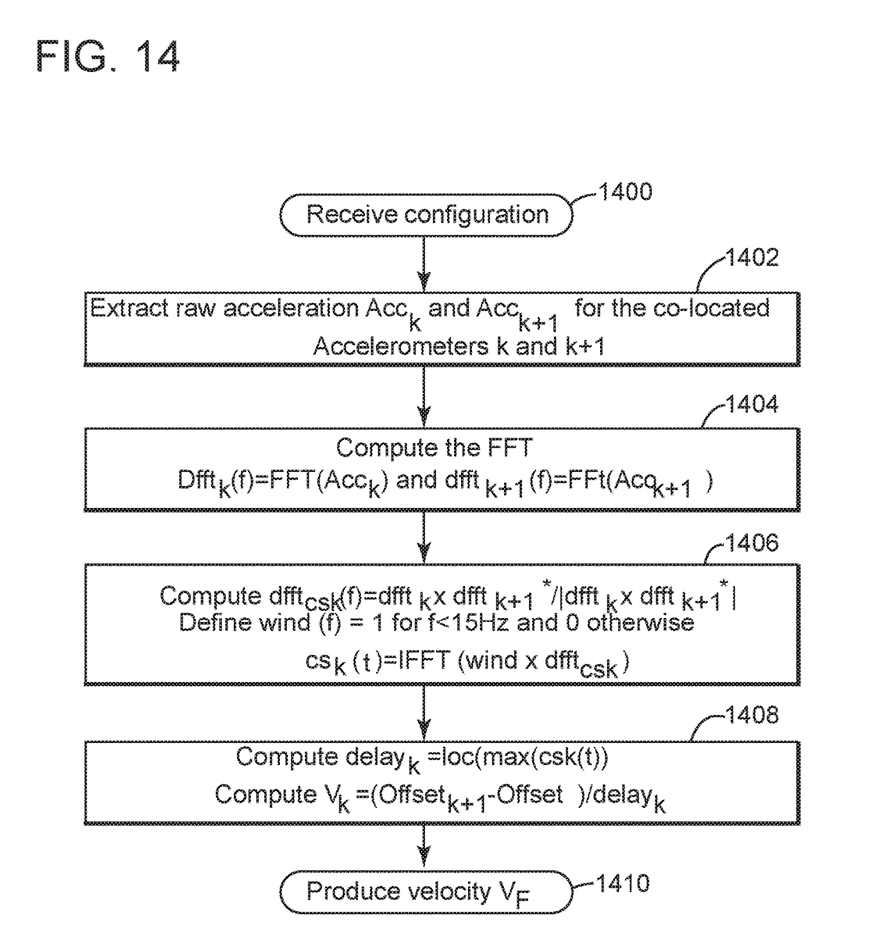
FIG. 14 is a flowchart of a method for calculating a phase velocity of a vibration that propagates along an antenna.

While the method illustrated in FIG. 13 may use a variety of software embodiments (routines) for calculating the value of the phase velocity for equation (5), the method now discussed and illustrated in FIG. 14 applies the GCC-PHAT algorithm. Thus, in step 1400, the method receives the input information discussed with regard to FIG. 11. Note that for this embodiment, the particle motion sensors are accelerometers that measure the Y and Z accelerations of the cable. If other type of sensors are used to measure, for example, the velocity or displacement, these quantities can be transformed by using the derivative operation into accelerations. In step 1402, the raw accelerations $Acc_k$ and $Acc_{k+1}$ for two adjacent sensors k and k+1 are extracted. In step 1404, a fast Fourier transform (FFT) dfft of the raw data $Acc_k$ and $Acc_{k+1}$ are calculated. In step 1406, based on the $dfft_k$ and $dfft_{k+1}$, a fast Fourier transform of a cross-correlation function $cs_k$, $dfft_{csk}(f)$, in the frequency domain, is calculated as the ratio shown in the figure. During the same step, a window wind(f) is defined to be one for frequencies smaller than 15 Hz (note that most of the particle motion along the streamer takes place in this window) and zero otherwise. With this window, it is in fact possible to determine the streamer's tension even if seismic data is simultaneously acquired with the vibration data as the seismic data has a frequency mostly above 15 Hz. Further, during the same step, the cross-correlation function $cs_k(t)$ in the time domain is calculated by performing an inverse FFT (ifft) of the product between the window and dfft. The method then advances to step 1408, in which the delay $delay_k$ of the particle motion propagation along the streamer, between adjacent sensors k and k+1, is defined as the location of the maximum of $cs_k(t)$. Finally, the phase velocity $v_k$ is calculated as the ratio of (1) the difference in offset between the two sensors k and k+1 (which is known from the characteristics of the antenna), and (b) the delay $delay_k$.

In this way, in step 1410 the value of the phase velocity of adjacent sensors k and k+1 is obtained. This procedure/routine may be used in other methods/routines for calculating the antenna's tension. An example of a method for calculating the antenna's tension is now discussed with regard to FIG. 15.

Figure 15:
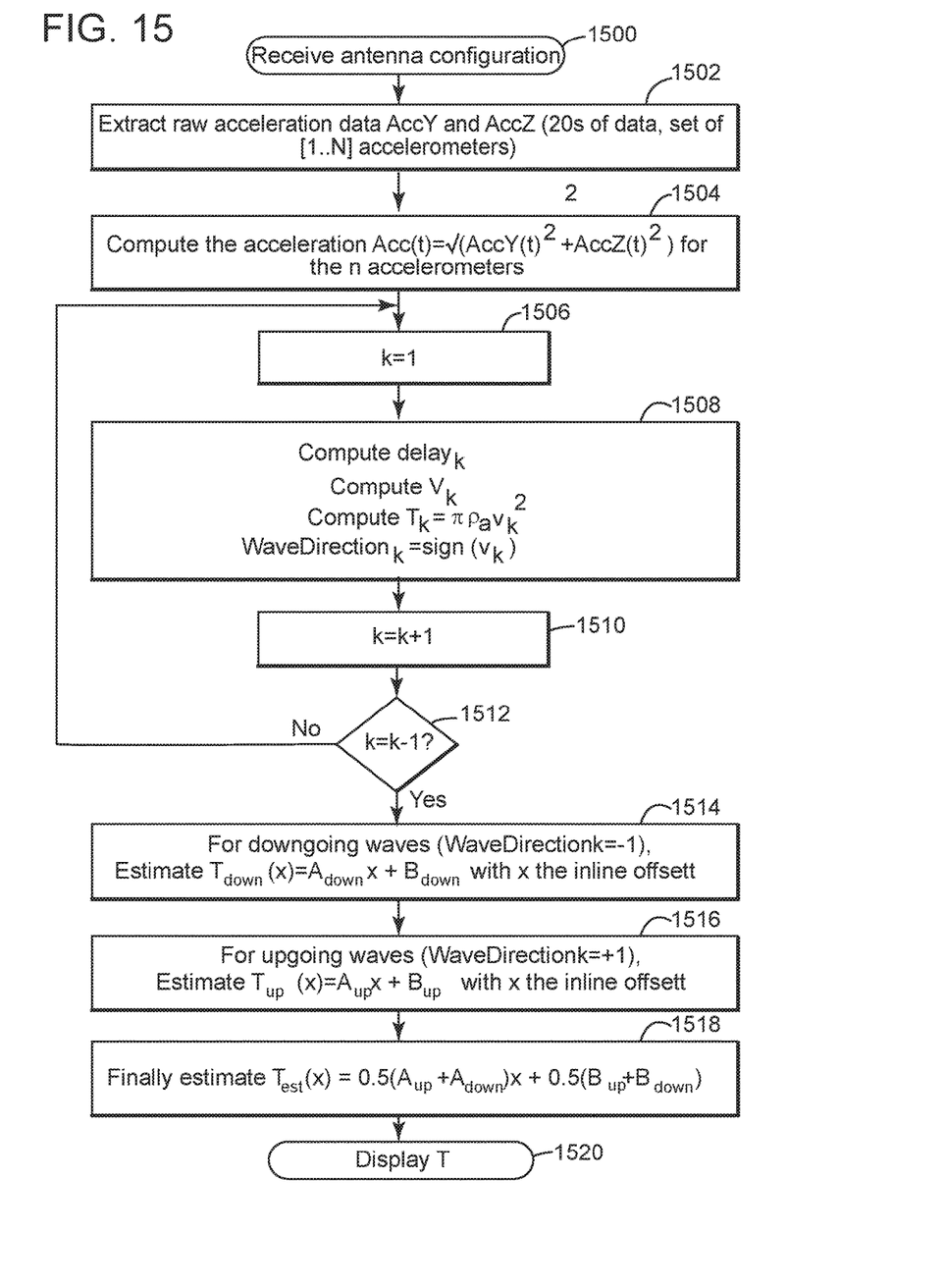
FIG. 15 is a flowchart of another method for calculating a tension along an antenna.

In step 1500, information about the antenna (e.g., density, diameter, etc.,) and also measurements performed with the particle motion sensors of the antenna are received. In step 1502, the raw accelerations measured by the sensors are extracted, for example, from windows of 20 s of data. The sensors (e.g., accelerometers) may be the seismic sensors distributed all along the length of the streamer. In step 1504, the accelerations in the YZ plane are calculated for each sensor. In one embodiment, the accelerations are calculated only for a subset of the sensors. The subset may be selected by antenna's operator based, for example, on previous experience, to monitor certain regions of the antenna and not the entire length of the antenna.

In step 1506, the method is initiated for the first sensor k=1. In step 1508, the $delay_k$ and velocity $v_k$ are calculated, for example, as discussed with regard to the method of FIG. 14. Those skilled in the art would understand that other routines than the one illustrated in FIG. 14 may be used for calculating the velocity $v_k$. In step 1508, based on (a) equation (3) or (4) or (7) and (8) or (10), and (b) equation (6), it is possible to calculate the tension $T_k$ and wave direction (sign($v_k$)).

The method then advances to step 1510 to move to the next sensor k+1, and in step 1512 a decision is made weather the last sensor has been considered. If the answer is no, the method returns to step 1508 to repeat the above noted calculations for the next sensor. If the answer is yes in step 1512, the method advances to step 1514 to calculate, for the downgoing waves, the tension $T_{down}$ and in step 1516 to calculate, for the upgoing waves, the tension $T_{up}$. In step 1518, the overall tension $T_{est}$ may be calculated as an average of the $T_{down}$ and $T_{up}$, as in equation (6). Note that in one application, one of the $T_{up}$ or $T_{down}$ may be considered to be the $T_{est}$. In step 1520, the tension $T_{est}$ is displayed so that a vessel's operator can take the necessary decisions (e.g., slows the vessel, slow the retrieval or deployment, increases the speed of the vessel, or increases the retrieval or deployment speed, etc.) for correctly handling the antenna and preventing unnecessary high tensions to be applied to the antenna. Avoiding high tensions on the antenna is important because the cost of a streamer can be in the millions. In addition, the time necessary for replacing a streamer at sea is high.

One or more of the above methods may be implemented in the processing unit 1100 of FIG. 11. In one application, the processing unit 1100 is the navigation system of the vessel.

As will be appreciated by one skilled in the art, the above discussed embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a method for estimating a tension in a cable towed underwater without the need to deploy dedicated tensile load sensors along the cable. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating a tension (T) in a towed antenna, the method comprising:
    towing the antenna in water, wherein the antenna includes plural particle motion sensors distributed along the antenna;
    measuring with the plural particle motion sensors transverse vibrations that propagate along the antenna;
    calculating a value of a phase velocity (vp) of the transverse vibrations that propagate along the antenna based on (1) an offset between two particle motion sensors and (2) a time delay of the transverse vibrations that propagate from one of the two particle motion sensors to another one of the two particle motion sensors;
    selecting a relation that links the phase velocity (vp) to the tension (T); and
    using the value of the phase velocity and the relation to determine the tension (T) at various locations of the plural particle motion sensors along the antenna.

2. The method of claim 1, wherein the particle motion sensors are accelerometers, the antenna is a seismic streamer, and the accelerometers are distributed over the entire length of the seismic streamer for measuring seismic data.

3. The method of claim 2, wherein the accelerometers record seismic data.

4. The method of claim 1, wherein the tension (T) is determined when a part of the antenna is stored on a towing vessel and another part of the antenna is in the water.

5. The method of claim 1, wherein the plural particle motion sensors are located inside a body of the antenna.

6. The method of claim 1, wherein the relation is determined by assuming that a speed of the antenna relative to the water is zero.

7. The method of claim 1, wherein the relation is given by:

$$v_p(k) = \pm \frac{2}{d}\sqrt{\frac{T + 4\pi^2 k^2 EI}{\pi \rho_a}},$$

where $\rho_a$ is an effective density of the antenna, d is a diameter of the antenna, f is a frequency, k is a wavenumber, E is the Young modulus of the antenna, I is an area moment of inertia, and sign ± indicates a direction of the propagation of the vibrations along the antenna.

8. The method of claim 1, wherein the relation is given by:

$$v_p(k) = \pm \frac{2}{d}\sqrt{\frac{T}{\pi \rho_a}},$$

where $\rho_a$ is an effective density of the antenna, d is a diameter of the antenna, and sign ± indicates a direction of the propagation of the transverse vibrations along the antenna.

9. The method of claim 1, wherein the relation is given by:

$$v_{p1} = \frac{\rho_w U_0}{\rho_a}\left[\sqrt{1 + \frac{\rho_a}{\rho_w}\left(\frac{T}{\sigma U_0^2} - 1\right)} - 1\right] \text{ and}$$

$$v_{p2} = -\frac{\rho_w U_0}{\rho_a}\left[\sqrt{1 + \frac{\rho_a}{\rho_w}\left(\frac{T}{\sigma U_0^2} - 1\right)} + 1\right],$$

where $\rho_a$ is an effective density of the antenna, $$\sigma = \pi \rho_w \frac{d^2}{4},$$

d is a diameter of the antenna, $U_0$ is water speed and $v_{p1}$ corresponds to a propagation of the transverse vibrations in one direction and $v_{p2}$ corresponds to a propagation of the transverse vibrations in an opposite direction.

10. The method of claim 9, wherein a first tension $T_1$ is calculated based on $v_{p1}$ and a second tension $T_2$ is calculated based on $v_{p2}$.

11. The method of claim 10, wherein the tension T is an average of the first tension and the second tension.

12. The method of claim 10, further comprising:
    applying a linear regression to the first and second tensions to determine an estimate value of the tension.

13. A computing device for calculating a tension (T) in a towed antenna, the computing device comprising:
an interface for receiving recordings from plural particle motion sensors distributed along the antenna, wherein the recordings are indicative of transverse vibrations that propagate along the antenna; and
a processing unit connected to the interface and configured to,
calculate a value of a phase velocity (vp) of the transverse vibrations that propagate along the antenna based on (1) an offset between two particle motion sensors and (2) a time delay of the transverse vibrations that propagate from one of the two particle motion sensors to another one of the two particle motion sensors;
select a relation that links the phase velocity (vp) to the tension (T); and
use the value of the phase velocity and the relation to determine the tension (T) at various locations of the plural particle motion sensors along the antenna.

14. The computing device of claim 13, wherein the particle motion sensors are accelerometers, the antenna is a seismic streamer, and the accelerometers are distributed over the entire length of the seismic streamer for measuring seismic data.

15. The computing device of claim 14, wherein the accelerometers record seismic data.

16. The computing device of claim 13, wherein the tension (T) is determined when a part of the antenna is stored on a towing vessel and another part of the antenna is in the water.

17. The computing device of claim 13, wherein the relation is given by:

$$v_p(k) = \pm \frac{2}{d}\sqrt{\frac{T + 4\pi^2 k^2 EI}{\pi \rho_a}},$$

where $\rho_a$ is an effective density of the antenna, d is a diameter of the antenna, f is a frequency, k is a wavenumber, E is the Young modulus of the antenna, I is an area moment of inertia, and sign ± indicates a direction of the propagation of the transverse vibrations along the antenna.

18. The computing device of claim 13, wherein the relation is given by:

$$v_p(k) = \pm \frac{2}{d}\sqrt{\frac{T}{\pi \rho_a}},$$

where $\rho_a$ is an effective density of the antenna, d is a diameter of the antenna, and sign ± indicates a direction of the propagation of the transverse vibrations along the antenna.

19. The computing device of claim 13, wherein the relation is given by:

$$v_{p1} = \frac{\rho_w U_0}{\rho_a}\left[\sqrt{1 + \frac{\rho_a}{\rho_w}\left(\frac{T}{\sigma U_0^2} - 1\right)} - 1\right] \text{ and }$$

$$v_{p2} = -\frac{\rho_w U_0}{\rho_a}\left[\sqrt{1 + \frac{\rho_a}{\rho_w}\left(\frac{T}{\sigma U_0^2} - 1\right)} + 1\right],$$

where $\rho_a$ is an effective density of the antenna, $$\sigma = \pi \rho_w \frac{d^2}{4},$$

d is a diameter of the antenna, $U_0$ is water speed and $v_{p1}$ corresponds to a propagation of the transverse vibrations in one direction and $v_{p2}$ corresponds to a propagation of the transverse vibrations in an opposite direction.

20. A streamer to be towed in water for collecting seismic data, the streamer comprising:
a body;
plural particle motion sensors located inside the body; and
a computing device located inside the body, the computing device including,
an interface for receiving recordings from the plural particle motion sensors, wherein the recordings are indicative of transverse vibrations that propagate along the streamer, and
a processing unit connected to the interface and configured to,
calculate a value of a phase velocity (vp) of the transverse vibrations that propagate along the streamer based on (1) an offset between two particle motion sensors and (2) a time delay of the transverse vibrations that propagate from one of the two particle motion sensors to another one of the two particle motion sensors;
select a relation that links the phase velocity (vp) to the tension (T); and
use the value of the phase velocity and the relation to determine the tension (T) at various locations of the plural particle motion sensors along the antenna.

* * * * *